UNITED STATES PATENT OFFICE.

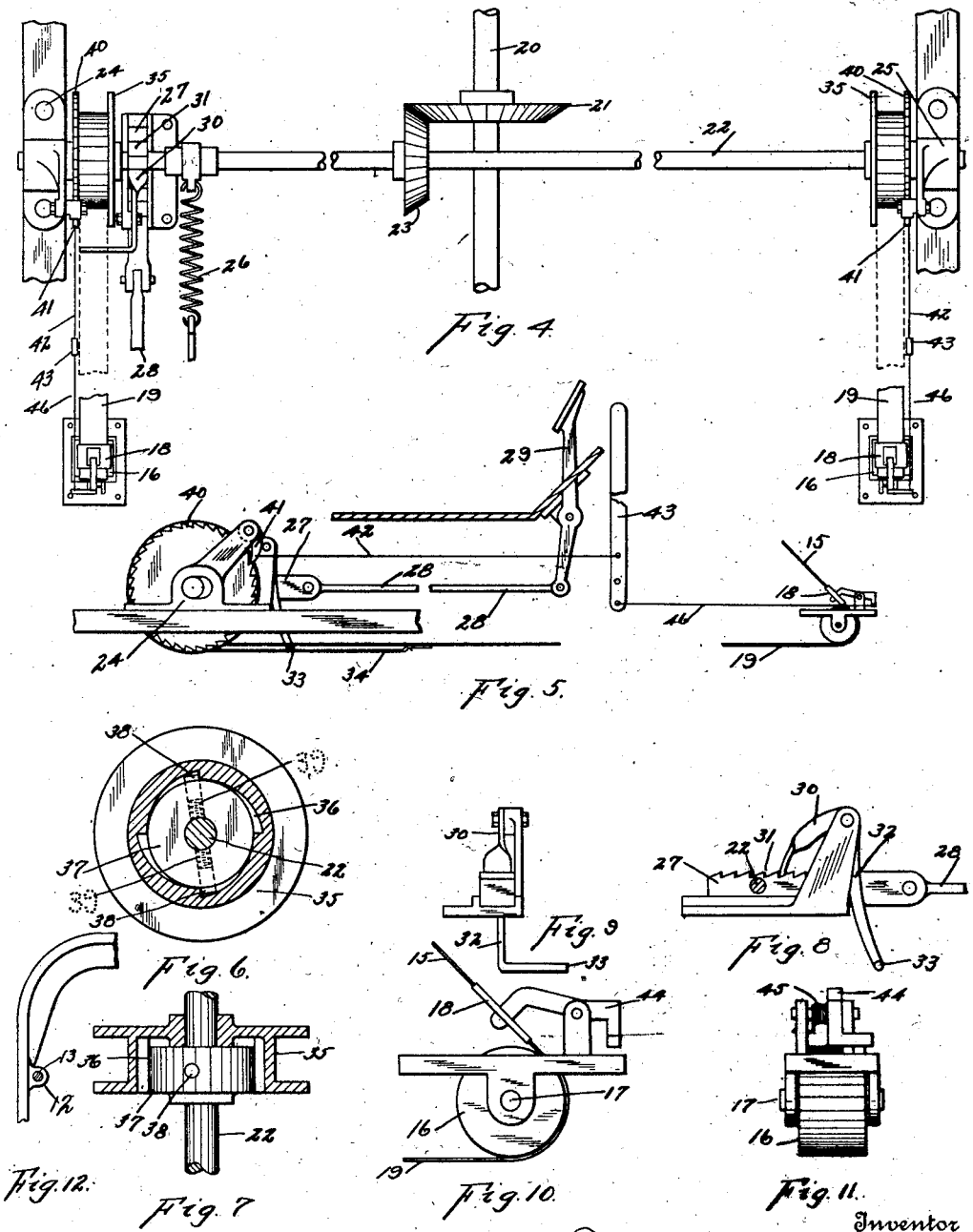

FRANK C. REYNOLDS, OF COLUMBUS, OHIO, ASSIGNOR OF ONE-HALF TO FRANK ZIEGLER AND ONE-HALF TO Z. H. BRADBURY, BOTH OF COLUMBUS, OHIO.

CONTROLLING MEANS FOR AUTOMOBILE-TOPS.

1,172,735.  Specification of Letters Patent.  Patented Feb. 22, 1916.

Application filed September 22, 1911. Serial No. 650,726.

*To all whom it may concern:*

Be it known that I, FRANK C. REYNOLDS, a citizen of the United States, residing at Columbus, in the county of Franklin and State of Ohio, have invented certain new and useful Improvements in Controlling Means for Automobile-Tops, of which the following is a specification.

My invention relates to controlling means for automobile tops and is particularly designed to provide an effectual actuating medium for moving a top from a substantially collapsed position to elevated position or vice versa. It contemplates the utilization of a power medium for effecting such elevation or collapse of the top and such power medium is desirably controlled by the operation of the propelling motor of the vehicle, although, in its broad aspect, my invention is not limited to this latter feature. In the production of these results, my invention in one of its forms desirably aims to provide a manual control for initially applying such power medium and an automatic release for rendering the power medium of no effect at a predetermined point, thereby insuring a manual initial control and an automatically operative means effective to obviate all danger of breakage of parts in the application of such power medium.

Figure 1:
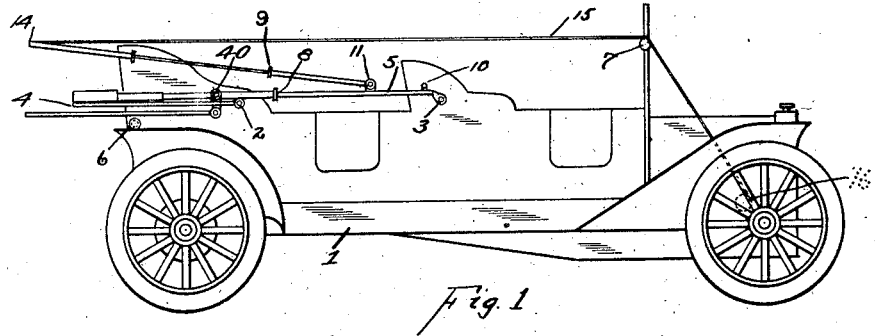
Figure 2:
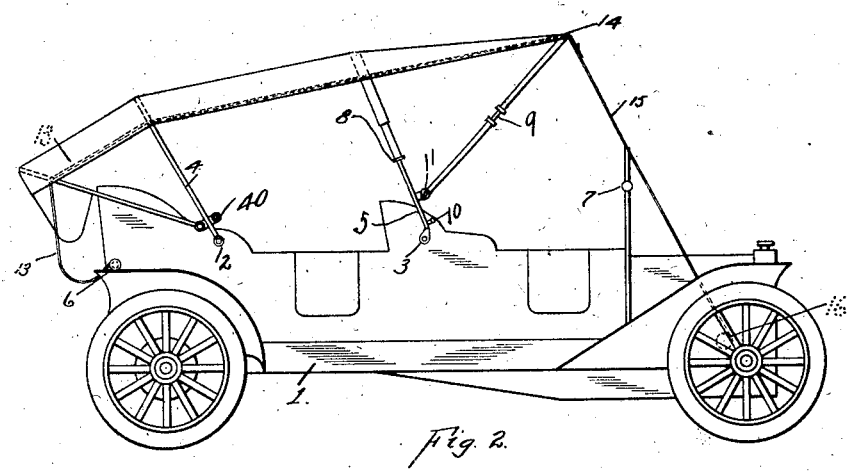
Figure 3:
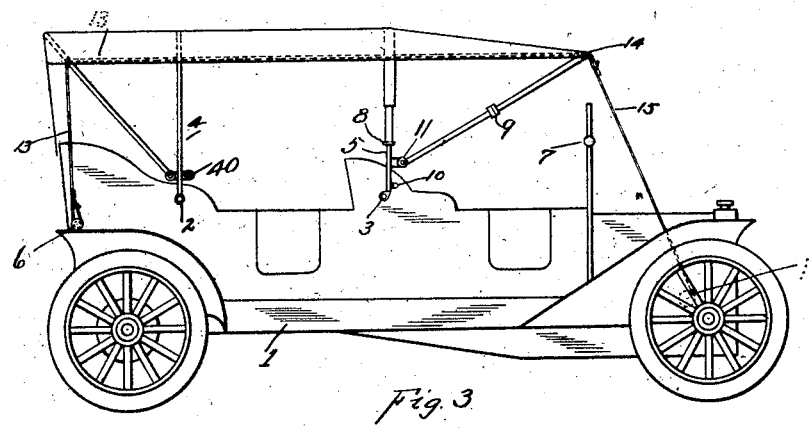

The preferred embodiment of my invention contemplates various more or less important details of structure, as for instance the extensible forward bow structure as is shown in the accompanying drawings, in which similar characters of reference designate corresponding parts and in which, Figure 1 is a side elevation of a motor vehicle showing the skeleton frame of the vehicle top in partially collapsed position with the controlling straps connected preparatory to elevation of the said frame, Fig. 2 is a side elevation of a motor vehicle showing my vehicle top partially raised by the controlling straps and showing the supplemental controlling straps carried thereby, Fig. 3 is a side elevation of a motor vehicle showing the top in elevated position, Fig. 4 is a detail view in plan of the mechanism for retracting the straps for raising or lowering the vehicle top, Fig. 5 is a detail view showing the controlling mechanism in side elevation, Fig. 6 is a vertical section taken through one of the reels and showing its manner of connection to the driven shaft upon which it is mounted, Fig. 7 is a partial sectional detail of the structure shown in Fig. 6, Fig. 8 is a detail view of my preferred mechanism for shifting the driven shaft and locking said shaft in position subject to automatic release by the straps, Fig. 9 is an end view of such shifting mechanism, Fig. 10 is a detail view of an automatic catch which is effective to lock the controlling straps in proper position when the vehicle top attains an elevated position, Fig. 11 is an end view of the details shown in Fig. 10, and, Fig. 12 is a detail view showing one form of collar carried by the bows of the vehicle top serving as conducting bearings for supplemental straps having a purpose to be hereinafter explained.

In the drawings, the vehicle body is shown at 1 as having brackets 2 and 3 for the reception of brace members 4 and 5 and also having leverage bearings 6 and 7 for a purpose to be hereinafter explained. The rear braces 4 are desirably of normal form, while the forward braces 5 are desirably extensible and may be telescoping as shown at 8 and 9. The forward braces are desirably provided with eyelets for detachably connecting them to their points of rest over the brackets 3, when in their forward or extended position, and likewise over the brackets 2, when telescoped into the collapsed rearmost position and these forward braces are further provided with hooks 10 for the reception of the ends of the telescoping members 9 which are detached from the point 11 when lowered and when the forward braces are moved to their rear-most position and attached to such hooks 10. When these forward braces are moved to their rearmost position, they are adapted to engage supports on the rear bows as shown at 4ª, this latter being common construction.

In addition to the structure described, it will be noted (Fig. 12) that the brace members are desirably provided on their interior with collar bearings 12 through which are adapted to pass straps 13 desirably circular in cross section and connected at their forward ends to some point of attachment at or near the front end of the forward top as at 14. The rear ends of these straps 13 may or may not be connected to the leverage bearings 6, it being only essential that these straps be provided with some means of connection to forward straps 15. These forward straps 15 are desirably substantially duplicates of the straps commonly in use for reinforcing the elevated automobile top for a multiple seated vehicle and they pass downwardly over bearings or pulleys 16 desirably journaled as at 17 at points at the forward lower end of the vehicle.

The straps 15 are desirably connected by loop members 18 to controlling strap members 19. Mounted upon the driving shaft 20 of the motor of the vehicle, which is normally disposed beneath the hood at the forward portion of the body, is a driving gear 21 preferably of friction form. In coactive relation to such driving gear, there is a driven shaft 22 having a complemental gear 23 and carried in bearings 24 and 25. These bearings are desirably of such structure as to permit of a shifting of the shaft into and out of operative relation with the shaft 20 through the medium of the gears 21 and 23 and such driven shaft 22 is desirably maintained normally out of coaction with said shaft 20 by a coiled spring 26. A means for positively shifting the driven shaft into coactive relation with the driving shaft is shown in Fig. 8 and comprises a shaft embracing link 27 having a throw-rod 28 and controlled by a pivoted treadle lever 29. When this link 27 is moved to move the driven shaft into its coactive relation with the driving shaft, the gravity pawl 30 coacts with a rack 31 upon the link 27 to lock said rack and link in its shifted position and consequently maintain the driven shaft in its coactive relation. The gravity pawl 30 is provided with a downwardly depending arm 32 and with a lateral extension 33 adapted to coact with the doubled end 34 of the belt 19. These belts are wound upon reels 35 which have the interior surfaces of their hubs 36 of ratchet form to coact with collars 37 carried upon the shaft 22, said collars having radial teeth 38 normally pressed outwardly by springs 39. In addition to this ratchet structure, which comprises a part of each reel, one outer rim of each reel is desirably formed with ratchet teeth as at 40 and has coacting therewith pivoted pawls 41 releasable by wires 42 connected above its pivot to a pivoted lever 43.

Mounted upon the bearings 17 is a latch 44 which is desirably pressed forwardly upon the operating straps by a torsional spring 45. These latches 44 are connected through the medium of wires 46 to the lever 43 below its pivot and through such connection, a forward movement of the lever 43 releases the latches 41 and also the latches 44.

In operation, it will be understood that the first step necessary to the elevation of the vehicle top when it is in collapsed position, is the extension of the brace members 5 and their attachment to their points of rest over the brackets 3. The next step is the attachment of the straps 15 to the forward end of the vehicle top. The treadle lever 29 is then depressed, which moves the driven shaft 22 into coactive relation with the driving shaft 20 of the motor of the vehicle. If the motor is in operation, the driven shaft is rotated which causes a retractile action upon the straps 19 through the medium of the reels 35. As a result, the top is elevated being brought up one section at a time, as shown in Figs. 1 and 2 and which serves to minimize the initial strain thereon. When the top reaches the position shown in Fig. 3, the catches 44 drop into locking relation with the loops 18. If it is desired to lower the top, the straps 15 are released from the forward end of the vehicle top and are carried rearwardly for attachment to the supplemental straps 13. Then, the same operation is repeated with the straps 13 and 15 having a leverage point on the leverage bearing 6, which serves to return the top to the position shown in Fig. 1. After this position is reached, the brace members 5 are released from their points of rest over the brackets and, after the members 9 have been released from the hooks 11, the brace members are telescoped and withdrawn to completely collapsed position, the eyelets on the brace members 5, being placed in position over the brackets 2, and being finally maintained therein by the attachment of the end of the member 9 to the hook 10.

In the operation of the driving structure, the movement of the top into raised or lowered position is effective through the action of the strap or cable 19 upon the lateral extensions 33 of the pawl 30 to release the link 27 and permit the resilient member 26 to withdraw the driven shaft from coactive relation with the driving shaft.

It will be understood that it is generally necessary to extend the straps individually and it is desired to extend one strap without in any way unwinding or otherwise effecting the other strap. This is effected by releasing one of the pawls 41 and drawing the strap forwardly from the reel. The rotation of the reel is transmitted through the clutch collar 37 to the shaft, which necessarily rotates the shaft. However, the other reel is at the same time maintained against movement by the rotation of the shaft by its pawl 41 and the shaft is permitted to rotate with relation thereto by the clutch collar structure 36, 37 and 38. It will be seen that oscillation of the lever 43 upon its pivot, serves to release the pawl 41 and the latch 44 simultaneously, although these may be otherwise controlled.

The supplemental straps 13 are peculiarly advantageous, not only because of their efficacy in collapsing the vehicle top, but because of their general reinforcing effect, which serves to effectually reduce the effect of strain in the automatic operation of the top and particularly in the automatic elevation thereof.

An essential and important function of my improved structure of top, resides in the fact that, after the top is in its intermediate position by extension of the forward braces, it is only necessary to depress the treadle 29. The operation then becomes entirely automatic, inasmuch as the reels retract the straps until the top reaches the proper position when the gravity pawls 30 are tripped by the straps through the medium of the lateral extension 33 and the retracting effect upon the straps is discontinued. At the same time, the pawls 41 and the latches 44 automatically drop into their locking and operative positions.

It will be understood that practically the same operation takes place in the movement of the top from raised to its intermediate position.

It will thus be seen that I have provided a comparatively simple structure which renders it possible to elevate and lower the top automatically and by a power carried by the vehicle.

What I claim, is—

1. The combination with a vehicle having running gear and a body thereon, of a vehicle top arranged to assume positions of collapse and elevation above said body, and motor driven means carried by the vehicle and arranged to move said top relative to the body.

2. The combination with a vehicle having running gear and a body thereon, of a vehicle top arranged to assume positions of collapse and elevation above said body, and motor driven means mounted on the vehicle and arranged to collapse and to elevate said top.

3. The combination with a vehicle having running gear and a body thereon, of a vehicle top arranged to assume positions of collapse and elevation above said body, and motor driven means carried by the vehicle operable independently of the movement of the vehicle and arranged to move said top relative to the body.

4. The combination with a vehicle having running gear and a body thereon, of a vehicle top arranged to assume positions of collapse or elevation, motor driven means carried by the vehicle and arranged to move said top relative to the body, and means for automatically rendering said last means inoperative.

5. The combination with a vehicle having running gear and a body thereon, of a vehicle top arranged to assume positions of collapse or elevation above said body, and motor driven means including straps retractable by said motor driven means for moving said top.

6. The combination with a vehicle having running gear and a body thereon, of a vehicle top arranged to assume positions of collapse or elevation above said body, motor driven means including straps retractable by said motor driven means for moving said top, and means for automatically checking the retraction of said straps at determinate points.

7. The combination with a vehicle having running gear and a body thereon, of a vehicle top arranged to assume positions of collapse or elevation, motor driven means including a plurality of flexible elements arranged to be connected to the top and retractable by said motor driven means to move said top, and means arranged to permit the paying out of one element independently of the other.

8. The combination with a vehicle body having a pair of spaced seats with a passenger entrance there-between, of a top comprising rear bows, front bows disposed in the rear of the said passenger entrance while the top is in normal lowered position, and a guide structure for said front bows to bring them into position in front of the passenger entrance during the raising of the top extending from the position of the front bow in its lowered rear position to the point of forward attachment of said front bow, said guide structure being capable of being telescoped within said front bows in either their raised or lowered position.

9. The combination with a vehicle body having a pair of spaced seats with a passenger entrance there-between, of a top comprising rear bows, front bows disposed in the rear of the said passenger entrance while the top is in normal lowered position, and a guide structure for said front bows to bring them into position in front of the passenger entrance during the raising of the top extending from the position of the front bow in its lowered rear position to the point of forward attachment of said front bow, said guide structure being such as to be automatically moved by elevation of the top out of its position across said passenger entrance to leave it unobstructed when the top is up.

10. The combination with a vehicle body having a plurality of separated seats, with a passenger entrance therebetween, of a top provided with rear bows connected to the body at the rear of said passenger entrance and with extensible forward bows arranged to be supported interchangeably at the front and at the rear of said passenger entrance.

11. The combination with a vehicle having running gear and a body thereon, of a vehicle top capable of assuming positions of collapse or elevation, motor driven means carried by said vehicle, flexible elements arranged to be connected to said top, said elements being retractable by the motor driven means, and means for locking said flexible elements at a predetermined position.

12. In a vehicle top, elements constructed for adjustment of said top to a point intermediate collapsed or raised position, straps for connection directly or indirectly to a forward point of the said top, and mechanically operative means on the vehicle for retracting said straps whereby the said top is elevated or collapsed.

13. In a vehicle top, elements constructed for adjustment of the said top to a point intermediate collapsed or raised position, straps for connection directly or indirectly to a forward point of the said top, and engine controlled means on the vehicle for retracting said straps whereby the said top is elevated or collapsed.

14. In a vehicle top, elements constructed for adjustment of the said top to a point intermediate collapsed or raised position, straps for connection directly or indirectly to a forward point of the said top, mechanically operative means on the vehicle for retracting said straps whereby said top is elevated or collapsed, and means for rendering said last-named means ineffective at any point in its operation.

15. In a vehicle top, elements constructed for adjustment of said top to a point intermediate collapsed or raised position, straps for connection directly or indirectly to a forward point of the said top, mechanically operative means on the vehicle for retracting said straps whereby said top is elevated or collapsed, and means for automatically rendering said last-named means ineffective at predetermined positions of the vehicle top.

16. In combination with a motor vehicle top structurally formed to permit adjustment to a position intermediate of collapsed and elevated position, straps capable of connection directly or indirectly to a point near the front of the said vehicle top, a driving shaft upon which said straps are wound, means for operatively connecting said driving shaft to the motor of the vehicle, and automatically controlled means for disconnecting said driving shaft.

17. In combination with a motor vehicle top constructed for assuming a position intermediate of collapsed and elevated position, straps capable of connection directly or indirectly to a point near the front of the said vehicle top, a driving shaft upon which said straps are wound, means for operatively connecting said driving shaft to the motor of the vehicle, and a pawl and ratchet device controlled by the movement of said straps for releasing said driving shaft.

18. In combination with a motor vehicle top structurally formed to permit adjustment to a position intermediate of collapsed and elevated position, a driving shaft operated by the motor of the said motor vehicle, a driven shaft, resilient means for maintaining said driven shaft out of coöperation with said driving shaft, means for positively moving the said driven shaft into coöperative relation with said driving shaft, straps for moving the said vehicle top into either intermediate or elevated position, and pawl and ratchet structure releasable by said straps at a determinate position thereof for normally maintaining said driving and driven shafts in coöperative relation.

19. In combination with a motor vehicle top structurally formed to permit adjustment to a position intermediate collapsed and elevated position, a driving shaft upon the motor of said vehicle, straps for attachment to the said vehicle top for movement from and to said intermediate position, a driven shaft, reels carried by said driven shaft and normally rotatable therewith, and structure permitting independent relative rotation of said driven shaft and said reels.

20. In combination with a motor vehicle top structurally formed to permit adjustment to a position intermediate of collapsed and elevated position, a driving shaft on the motor of the said vehicle, a driven shaft, reels clutched upon said shaft in a manner to receive rotation therefrom in one direction, straps carried by said reels for attachment to the said vehicle top, and means for locking either reel against rotation during the unwinding of the strap from the other reel.

21. In combination with a vehicle top structurally formed to permit adjustment to a position intermediate of collapsed and elevated position, straps for connection to the said vehicle top either directly or indirectly for elevation or movement to such intermediate position, power driving means for said straps, bearings over which said straps run, and elements for locking said straps at said bearings.

22. In combination with a vehicle top structurally formed to permit adjustment to a position intermediate of collapsed and elevated position, straps for connection to the said vehicle top either directly or indirectly for elevation or movement to such intermediate position, power driving means for said straps, bearings over which said straps run, and elements for automatically locking said straps at said bearings.

23. In combination with a vehicle top structurally formed to permit adjustment to a position intermediate between collapsed and elevated position, straps extending from a point near the forward end of the said vehicle top to a point at the rear of the vehicle, leverage elements near the terminus of said straps, and mechanically controlled straps for connection to the forward end of the said vehicle top or to the terminus of the said first-named straps.

24. The combination of a vehicle top, a pivoted rear brace structure, a forward brace structure extensible for attachment to its point of rest during collapsed condition of the vehicle top, straps slidingly mounted on and extending throughout the vehicle top, leverage bearings on the rear end of the body of the vehicle, and mechanically controlled straps for attachment directly to the forward end of said vehicle top or for connection to the terminus of said first named straps with a leverage over said leverage bearings.

25. The combination with an automobile, comprising a body and propelling means mounted thereon, of a cover including a supporting frame, mechanism for raising and lowering the supporting frame, actuating means for said mechanism operated by the propelling means of the automobile, and means for controlling the operation of the mechanism by said propelling means.

26. The combination with an automobile, comprising a body and propelling means mounted thereon, said propelling means consisting of a motor and a shaft driven by the motor, of a cover including an extensible supporting frame movable longitudinally along the body and capable of being raised and lowered, mechanism for raising and lowering the supporting frame and extending the same, said mechanism being operated by the propelling means, and means for controlling the movement of the cover by said propelling means.

In testimony whereof I affix my signature in presence of two witnesses.

FRANK C. REYNOLDS.

Witnesses:
   EDWIN P. CORBETT,
   WALTER E. S. BOCK.